US006314804B1

(12) United States Patent
Nemie, Jr. et al.

(10) Patent No.: US 6,314,804 B1
(45) Date of Patent: Nov. 13, 2001

(54) METHOD AND APPARATUS FOR ALIGNING AND INSERTING A FUEL INJECTOR IN A TEST HEAD

(75) Inventors: Edward J. Nemie, Jr., Newport News; Dennis E. Rooker, Williamsburg, both of VA (US)

(73) Assignee: Siemens Automotive Corporation, Auburn Hills, MI (US)

( * ) Notice: Subject to any disclaimer, the term of this patent is extended or adjusted under 35 U.S.C. 154(b) by 0 days.

(21) Appl. No.: 09/340,109

(22) Filed: Jun. 25, 1999

(51) Int. Cl.[7] .................... G01M 15/00
(52) U.S. Cl. .................... 73/119 A; 73/865.9
(58) Field of Search .................... 73/119 A, 865.8, 73/865.9

(56) References Cited

U.S. PATENT DOCUMENTS 4,061,027 * 12/1977 Emerson .................... 73/119 A
4,712,421 * 12/1987 Young .................... 73/119 A
5,000,043 * 3/1991 Bunch, Jr. et al. .................... 73/119 A

* cited by examiner

*Primary Examiner*—Helen Kwok
*Assistant Examiner*—Nashmiya Fayyaz

(57) ABSTRACT

A method of inserting an injector in a test head includes inserting the injector in a puck; aligning the puck beneath the test head; engaging a bottom of the puck with a floating cone assembly; raising the puck upwards towards the test head; and inserting a top portion of the injector into the test head. The floating locator cone assembly includes a floating locator cone mount; a ball thrust bearing assembly inserted in the floating locator cone mount; and a floating locator cone inserted in the floating locator cone mount on top of the ball thrust bearing. Use of the floating locator cone assembly allows the puck to center itself thereby allowing the injector to be properly aligned upon insertion in the test head. Proper alignment of the injector reduces false leak test readings and the consequent rejection of good injectors.

11 Claims, 3 Drawing Sheets

FIG. 5
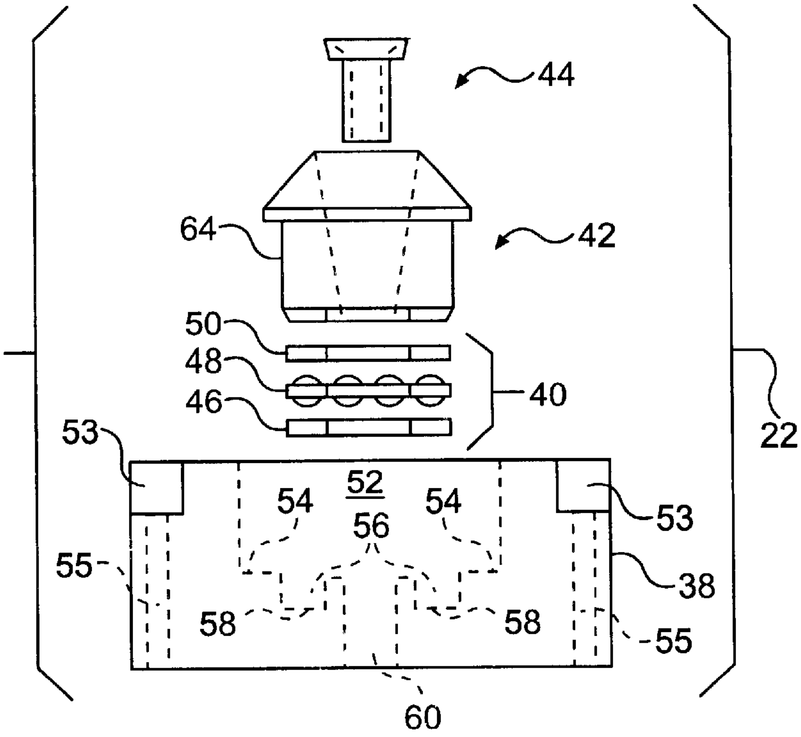
FIG. 6
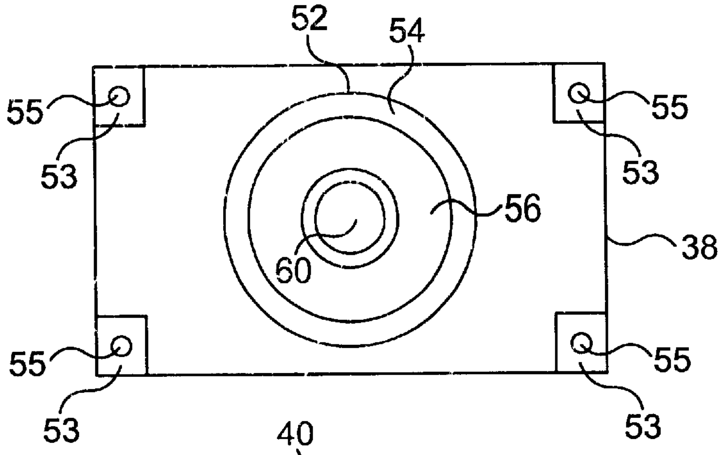
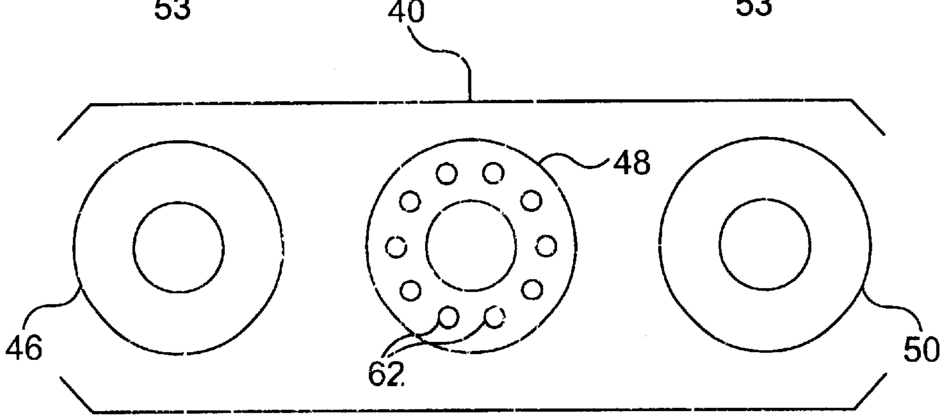
FIG. 7

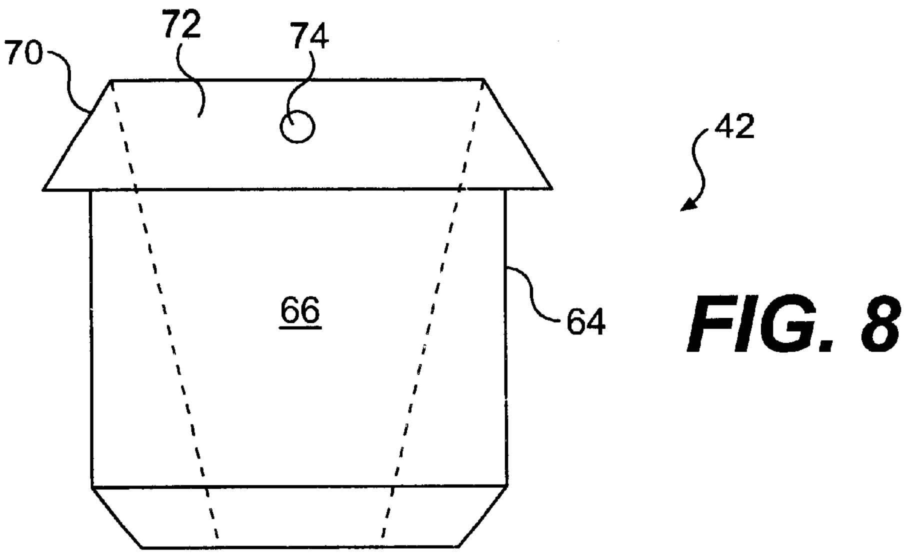
FIG. 8
FIG. 9
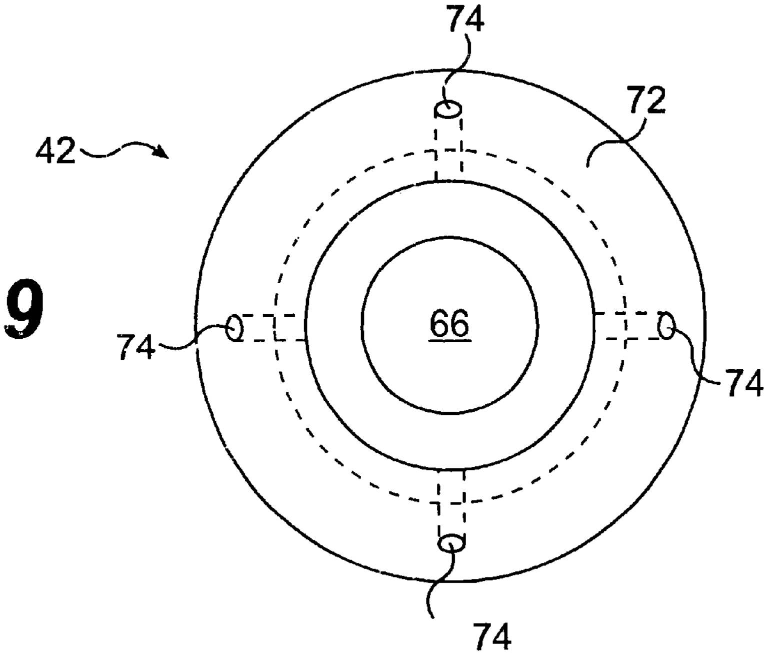
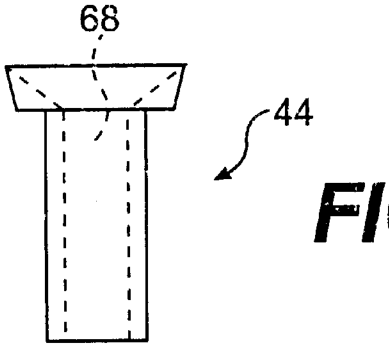
FIG. 10

METHOD AND APPARATUS FOR ALIGNING AND INSERTING A FUEL INJECTOR IN A TEST HEAD

BACKGROUND OF THE INVENTION

The invention relates in general to the testing of fuel injectors and in particular to a method and apparatus for aligning and inserting a fuel injector in a test head.

Automatic testing machinery for fuel injectors utilize a moving conveyor on which are carried pucks. Each puck carries a fuel injector. The pucks are routed to various testing stations to assure that the newly manufactured fuel injector meets quality standards.

A puck with an injector carried therein is automatically placed under a test head. An actuator such as a hydraulic or pneumatic cylinder is located beneath the puck at its position beneath the test head. A fixed cone is mounted on the actuator for engaging the bottom of the puck. The fixed cone raises the puck upwards toward the test head so that the injector is inserted in the test head. An O-ring on the end of the injector provides a seal inside the test head. If the injector is not properly aligned with the test head, false leak readings may result. That is, the leakage may be occurring where the O-ring seals with the test head rather than in the injector itself. If that occurs, a perfectly good injector may be rejected because of a false leak reading.

Because of the speed at which the actuator raises the puck, the puck may not have enough time to center itself on the fixed cone before the injector engages the test head. The result is misalignment of the injector in the test head and/or damage to the top O-ring. At the last test head, the injector is fully manufactured and all other tests have been conducted. Therefore, to reject a good injector at the last test head is to lose all the parts and labor invested in a completely manufactured injector. If the rejection of good injectors at the last test head can be reduced, substantial savings can be realized.

SUMMARY OF THE INVENTION

It is an object of the invention to provide an apparatus and method for reducing the number of good injectors falsely rejected at a test head.

It is another object of the invention to provide an apparatus and method for reducing false leak test readings.

It is a further object of the invention to provide an apparatus and method which allows an injector to center itself as it is inserted in a test head.

It is yet another object of the invention to provide an apparatus and method to prevent damage to the top O-ring of an injector as it is inserted in a test head.

These and other objects of the invention are achieved by a floating locator cone assembly comprising a floating locator cone mount; a ball thrust bearing assembly inserted in the floating locator cone mount; and a floating locator cone inserted in the floating locator cone mount on top of the ball thrust bearing assembly.

Preferably, the floating locator cone assembly further comprises a catch cup inserted in the floating locator cone.

The floating locator cone mount includes a first bore extending partially therethrough to a radially inwardly formed step and an annular bore extending from the step partially through the floating locator cone mount; wherein the first bore has a larger diameter than the annular bore and a bottom of the annular bore provides a seat for the ball thrust bearing assembly. The floating locator cone mount defines a through hole concentric with the annular bore.

The ball thrust bearing assembly comprises a first washer disposed on the seat for the ball thrust bearing assembly, a ball thrust bearing disposed on the first washer and a second washer disposed on the ball thrust bearing.

The floating locator cone includes a generally cylindrical portion which is inserted in the first bore of the floating locator cone mount and rests on the second washer of the ball thrust bearing assembly. The floating locator cone also includes a generally converging through hole, wherein the catch cup is inserted in the generally converging through hole.

In addition, the floating locator cone includes a top portion which extends above the floating locator cone mount and wherein the top portion includes an external surface configured to engage a mating surface in a bottom of a puck.

Another aspect of the invention is a method of inserting an injector in a test head comprising inserting the injector in a puck; aligning the puck beneath the test head; engaging a bottom of the puck with a floating cone assembly; raising the puck upwards towards the test head; and inserting a top portion of the injector into the test head.

A further aspect of the invention is an apparatus for testing fuel injectors comprising a conveyor; at least one puck disposed on the conveyor; a fuel injector disposed in the at least one puck; a rotary table adjacent the conveyor for receiving pucks with fuel injectors contained therein from the conveyor; at least one test head located above the rotary table; an actuator located below the test head and the rotary table for raising and lowering a puck towards and away from the test head; and a floating cone assembly attached to the actuator, for engaging a bottom of a puck. The actuator may further comprise a spacer for vertical alignment of the floating cone assembly.

Further objects, features and advantages of the invention will become apparent from the following detailed description taken in conjunction with the following drawing.

BRIEF DESCRIPTION OF THE DRAWING

FIG. 5 is an exploded side view of the floating locator cone assembly of the present invention.

FIG. 6 is a top view of the floating locator cone mount of the present invention.

FIG. 7 is an exploded view of the ball thrust bearing assembly of the present invention.

FIG. 8 is a side view of the floating locator cone of the present invention.

FIG. 9 is a top view of the floating locator cone of the present invention.

FIG. 10 is a side view of the catch cup of the present invention.

DETAILED DESCRIPTION OF THE PREFERRED EMBODIMENT

Figure 1:
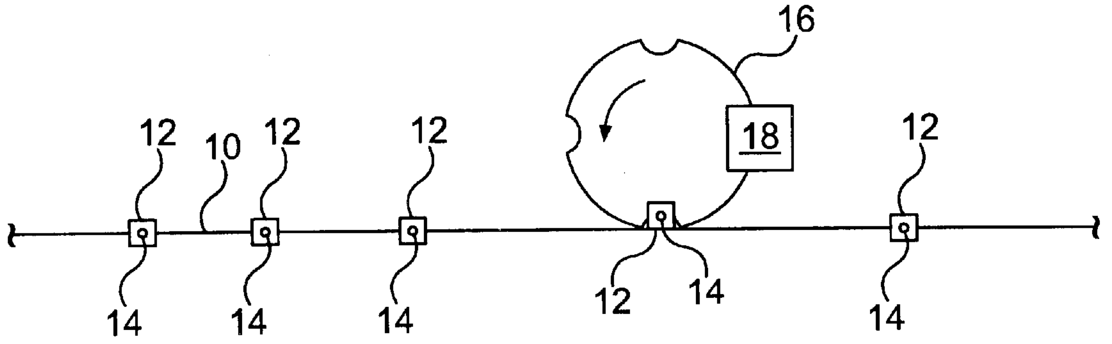
FIG. 1 is a schematic top view of a portion of an automatic machine for testing fuel injectors.

FIG. 1 is a schematic top view of a portion of an automatic machine for testing fuel injectors. Pucks 12 are placed on a moving conveyor 10. Each puck 12 holds a fuel injector 14.

The pucks 12 are off loaded from the conveyor 10 onto a rotary table 16. At least one test head 18 is located above the rotary table 16. To perform the test, a puck 12 is positioned below the test head 18. The puck with injector therein is then lifted upward to the test head and the top of the injector is inserted in the test head. The test is then performed. After the test is finished, the puck is lowered to the table and another puck with another injector is positioned below the test head. The process is then repeated.

Figure 2:
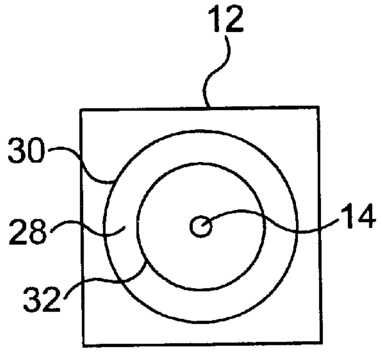
FIG. 2 is a bottom view of a puck used to carry an injector on a conveyor.

FIG. 2 is a bottom view of a puck 12 used to carry an injector 14 on the conveyor 10. The bottom of the puck includes a conical mating surface 28 which mates with a conical surface on the floating locator cone 42, which is described below. The conical mating surface 28 converges inwardly into the puck from a larger diameter 30 to a smaller diameter 32.

Figure 3:
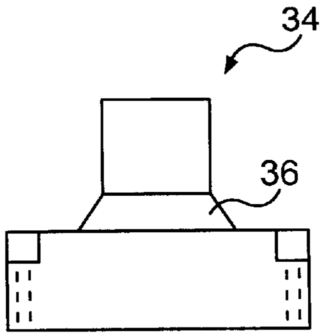
FIG. 3 is a side view of a fixed cone.

FIG. 3 is a side view of a fixed cone 34 that the present invention replaces. The fixed cone 34 includes a surface 36 for mating with the surface 28 of the puck. The fixed cone 34 is a rigid piece.

Figure 4:
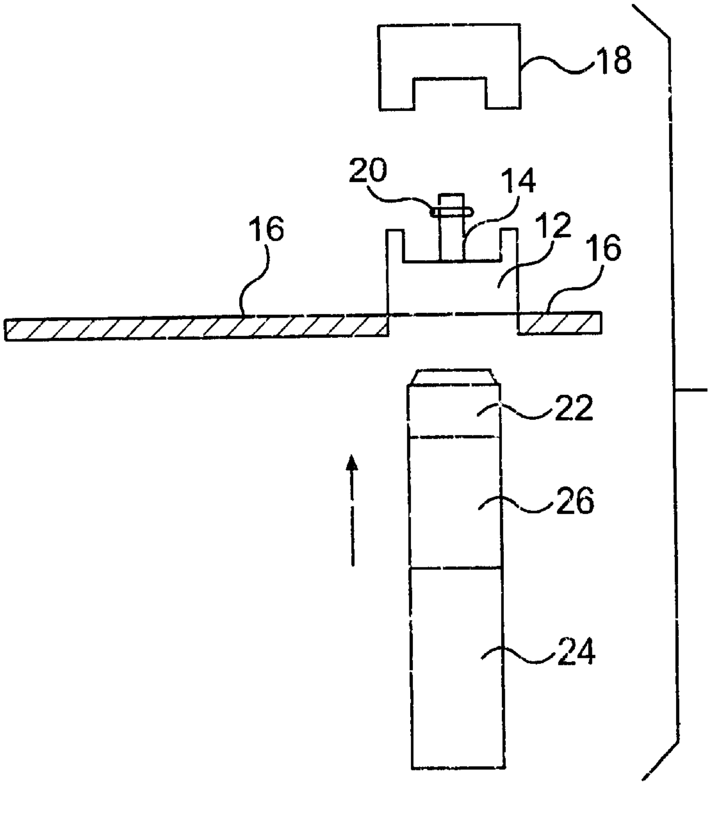
FIG. 4 is a schematic side view of an apparatus used to insert an injector into a test head, according to the present invention.

FIG. 4 is a schematic side view of an apparatus used to insert an injector 14 into a test head 18, according to the present invention. The rotary table 16 supports the puck 12 beneath the test head 18. The puck contains an injector 14 having a top O-ring 20. The top O-ring 20 seals the injector 14 in the test head. An actuator 24, such as a hydraulic or pneumatic cylinder, lifts the puck and injector upward to the test head. The actuator 24 may include a spacer 26 for vertical adjustment. The floating locator cone assembly 22 of the present invention is rigidly mounted to the top of the actuator 24 or spacer 26 by, for example, bolts.

The actuator 24 lifts the floating locator cone assembly 22 into the bottom of the puck 12 where the floating locator cone assembly 22 contacts the mating surface 28 of the puck. The puck and injector are then lifted upwards to the test head 18. The top of the injector 14 enters the test head and is sealed there by the top O-ring 20. The test then commences. After the test is finished, the actuator 24 lowers the puck so that the puck again rests on the rotary table 16. The rotary table rotates and another puck 12 is then positioned below the test head.

FIG. 5 is an exploded side view of the floating locator cone assembly 22 of the present invention. The floating locator cone assembly 22 comprises a floating locator cone mount 38, a ball thrust bearing assembly 40 inserted in the floating locator cone mount 38 and a floating locator cone 42 inserted in the floating locator cone mount 38 on top of the ball thrust bearing assembly 40. Preferably, a catch cup 44 is inserted in the floating locator cone 42. The catch cup funnels fluid leakage from the injector being tested to a hose (not shown). The ball thrust bearing assembly comprises a first washer 46, a ball thrust bearing 48 and a second washer 50.

The floating locator cone mount 38 includes a first bore 52 extending partially therethrough to a radially inwardly formed step 54. An annular bore 56 extends from the step 54 partially through the floating locator cone mount 38. The first bore 52 has a larger diameter than the annular bore 56. The bottom 58 of the annular bore provides a seat for the ball thrust bearing assembly 40. The floating locator cone mount 38 defines a through hole 60 which is concentric with the annular bore 56. Cutout portions 53 lead to through holes 55 in which fasteners such as bolts are inserted to rigidly attach the floating locator cone mount 38 to the actuator 24 or spacer 26.

FIG. 6 is a top view of the floating locator cone mount 38 of the present invention. Four cutout portions 53 and four mounting holes 55 are shown. The first bore 52 leads to the step 54 and the annular bore 56. The through hole 60 in the center of the floating locator cone mount receives the catch cup 44.

FIG. 7 is an exploded view of the ball thrust bearing assembly 40 of the present invention. The ball thrust bearing assembly 40 comprises a first washer 46 which is disposed on the seat formed by the bottom 58 of the annular bore 56. A ball thrust bearing 48 including balls 62 is disposed on the first washer 46 and a second washer 50 is disposed on the ball thrust bearing 48.

FIG. 8 is a side view and FIG. 9 is a top view of the floating locator cone 42 of the present invention. The floating locator cone 42 includes a generally cylindrical portion 64 which is inserted in the first bore 52 of the floating locator cone mount 38. The floating locator cone 42 rests on the second washer 50 of the ball thrust bearing assembly 40. The floating locator cone 42 includes a generally converging through hole 66. A catch cup 44 (FIG. 10) is inserted in the generally converging through hole 66. The catch cup 44 includes an opening 68 for catching and directing leakage fluid from the injector being tested.

The floating locator cone 42 further includes a top portion 70 which extends above the floating locator cone mount 38. The top portion 70 includes a conical external surface 72 configured to engage the conical mating surface 28 in the bottom of a puck 14. The generally cylindrical portion 64 of the floating locator cone 42 has an outside diameter that is smaller than an inside diameter of the first bore 52. Preferably, the outside diameter of the generally cylindrical portion 64 is about 0.02 inches smaller than the inside diameter of the first bore 52.

Because the generally cylindrical portion 64 has an outside diameter that is smaller than an inside diameter of the first bore 52, the floating locator cone 42 can "float" inside the floating locator cone mount 38. This feature allows the injector 14 to more accurately align itself as it is being inserted in the test head 18 than when using the fixed cone 34. More accurate alignment between the injector 14 and the test head 18 results in less chance of damage to the top O-ring 20 and less chance of leakage around the top of the injector during the test.

The top portion 70 of the floating locator cone 42 includes at least one hole 74 formed therein so that air may pass between the external surface 72 of the top portion 70 and the mating surface 28 of the bottom of the puck 12. The air prevents the two mating surfaces from sticking together when the puck is lowered back to the rotary table. In a preferred embodiment, there are four holes 74 placed about ninety degrees apart.

The floating locator cone 42 and the catch cup 44 are preferably made of stainless steel. The floating locator cone mount 38 is preferably made of aluminum.

In accordance with the present invention, a method of inserting an injector 14 in a test head 18 comprises inserting the injector 14 in a puck 12; aligning the puck 12 beneath the test head 18; engaging a bottom of the puck 12 with a floating cone assembly 22; raising the puck 12 upwards towards the test head 18; and inserting a top portion of the injector 14 into the test head 18. Use of the floating locator cone assembly 22 allows the puck 12 to center itself thereby allowing the injector 14 to be properly aligned upon insertion in the test head 18. Proper alignment of the injector 14 reduces false leak test readings and the consequent rejection of good injectors. Use of the invention has resulted in an improvement in injectors passing the test. Depending on the product, the improvement varies from 0.56 to 5.07%.

While the invention has been described with reference to certain preferred embodiments, numerous changes, alterations and modifications to the described embodiments are possible without departing from the spirit and scope of the invention as defined in the appended claims, and equivalents thereof.

What is claimed is:

1. A method of inserting an injector in a test head comprising:

inserting the injector in a puck;

aligning the puck beneath the test head;

engaging a bottom of the puck with a floating cone assembly;

raising the puck upwards towards the test head; and inserting a top portion of the injector into the test head.

2. The method of claim 1 wherein the floating cone assembly comprises a floating locator cone mount; a ball thrust bearing assembly inserted in the floating locator cone mount; and a floating locator cone inserted in the floating locator cone mount on top of the ball thrust bearing.

3. The method of claim 2 wherein the floating locator cone assembly further comprises a catch cup inserted in the floating locator cone.

4. The method of claim 2 wherein the floating locator cone mount includes a first bore extending partially therethrough to a radially inwardly formed step and an annular bore extending from the step partially through the floating locator cone mount; and wherein the first bore has a larger diameter than the annular bore and a bottom of the annular bore provides a seat for the ball thrust bearing assembly.

5. The method of claim 4 wherein the bottom of the floating locator cone mount defines a through hole concentric with the annular bore.

6. The method of claim 5 wherein the ball thrust bearing assembly comprises a first washer disposed on the seat for the ball thrust bearing assembly, a ball thrust bearing disposed on the first washer and a second washer disposed on the ball thrust bearing.

7. The method of claim 6 wherein the floating locator cone includes a generally cylindrical portion which is inserted in the first bore of the floating locator cone mount and rests on the second washer of the ball thrust bearing assembly.

8. The method of claim 7 wherein the floating locator cone includes a generally converging through hole, the floating locator cone assembly further comprising a catch cup inserted in the generally converging through hole.

9. The floating locator cone assembly of claim 8 wherein the floating locator cone includes a top portion which extends above the floating locator cone mount and wherein the top portion includes an external surface configured to engage a mating surface in the bottom of the puck.

10. The method of claim 9 wherein the generally cylindrical portion of the floating locator cone has an outside diameter that is smaller than an inside diameter of the first bore.

11. The method of claim 10 wherein the top portion of the floating locator cone includes at least one hole formed therein so that air may pass between the external surface of the top portion and the mating surface of the bottom of the puck.

* * * * *